United States Patent

Hiemer

(10) Patent No.: US 8,925,764 B2
(45) Date of Patent: Jan. 6, 2015

(54) PISTON SECURING DEVICE

(75) Inventor: Andreas Hiemer, Schubelbach (CH)

(73) Assignee: Sulzer Mixpac AG, Haag (CH)

(*) Notice: Subject to any disclaimer, the term of this patent is extended or adjusted under 35 U.S.C. 154(b) by 0 days.

(21) Appl. No.: 13/543,375

(22) Filed: Jul. 6, 2012

(65) Prior Publication Data

US 2013/0015205 A1      Jan. 17, 2013

(30) Foreign Application Priority Data

Jul. 15, 2011   (EP) ..................................... 11174214

(51) Int. Cl.
| | | |
|---|---|---|
| B67D 7/70 | (2010.01) | |
| B65D 81/32 | (2006.01) | |
| B29C 45/44 | (2006.01) | |
| B65D 83/00 | (2006.01) | |
| B29L 31/00 | (2006.01) | |
| B29C 45/26 | (2006.01) | |

(52) U.S. Cl.
CPC .......... B65D 81/325 (2013.01); B29C 45/4407 (2013.01); B65D 83/0005 (2013.01); *B29L 2031/715* (2013.01); *B29C 45/261* (2013.01)
USPC ........... 222/137; 222/252; 222/326; 222/343; 222/386

(58) Field of Classification Search
CPC ............................ B65D 83/00; B65D 83/0022
USPC ......... 222/137, 343, 135, 139, 386, 326, 327, 222/142, 251, 252, 391
See application file for complete search history.

(56) References Cited

U.S. PATENT DOCUMENTS

| | | | | |
|---|---|---|---|---|
| 5,310,091 | A * | 5/1994 | Dunning et al. | 222/135 |
| 5,400,926 | A * | 3/1995 | Keller | 222/327 |
| 6,056,164 | A * | 5/2000 | Wakayama | 222/327 |
| 8,235,255 | B2 * | 8/2012 | Springhorn et al. | 222/386 |
| 8,430,276 | B2 * | 4/2013 | Longo, II | 222/327 |
| 2001/0015341 | A1 | 8/2001 | Higgins | |
| 2002/0027121 | A1 | 3/2002 | McNary et al. | |
| 2012/0048884 | A1 * | 3/2012 | Wang et al. | 222/1 |
| 2012/0061424 | A1 * | 3/2012 | Obrist | 222/387 |
| 2012/0247323 | A1 * | 10/2012 | Obrist | 92/175 |
| 2013/0105515 | A1 * | 5/2013 | Frey et al. | 222/137 |

FOREIGN PATENT DOCUMENTS

| | | | | |
|---|---|---|---|---|
| DE | 20 2004 017878 U1 | 1/2005 | | |
| EP | 0 351 441 A1 | 1/1990 | | |
| EP | 351441 A1 * | 1/1990 | | B65D 83/00 |
| EP | 0 688 727 A1 | 12/1995 | | |
| EP | 688727 A1 * | 12/1995 | | B65D 83/00 |
| GB | 2223748 A | 4/1990 | | |
| WO | WO 91/05731 A1 | 5/1991 | | |

* cited by examiner

*Primary Examiner* — Kevin P Shaver
*Assistant Examiner* — Michael J Melaragno
(74) *Attorney, Agent, or Firm* — K&L Gates LLP

(57) ABSTRACT

A cartridge contains a storage chamber for a fluid filler material in which a piston can be movably received, wherein the storage chamber has a filling end and a discharge end and an inner wall extending between the filling end and the discharge end and the piston is displaceable in the storage chamber from the filling end to the discharge end along the inner wall to discharge the filler material from the storage chamber and the filler material can be enclosed in a sealing manner in the storage chamber by the piston. The piston is captively held within the inner wall by a projection provided at the inner wall in the environment of the filling end.

11 Claims, 7 Drawing Sheets

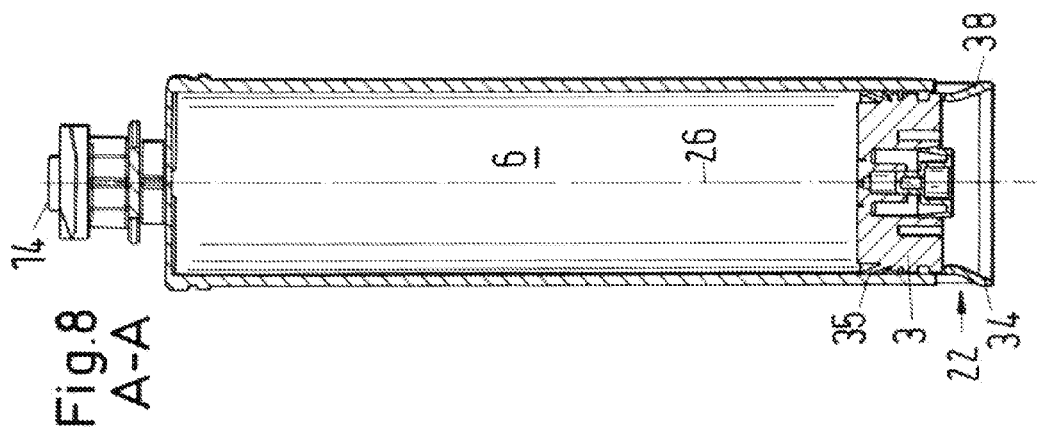
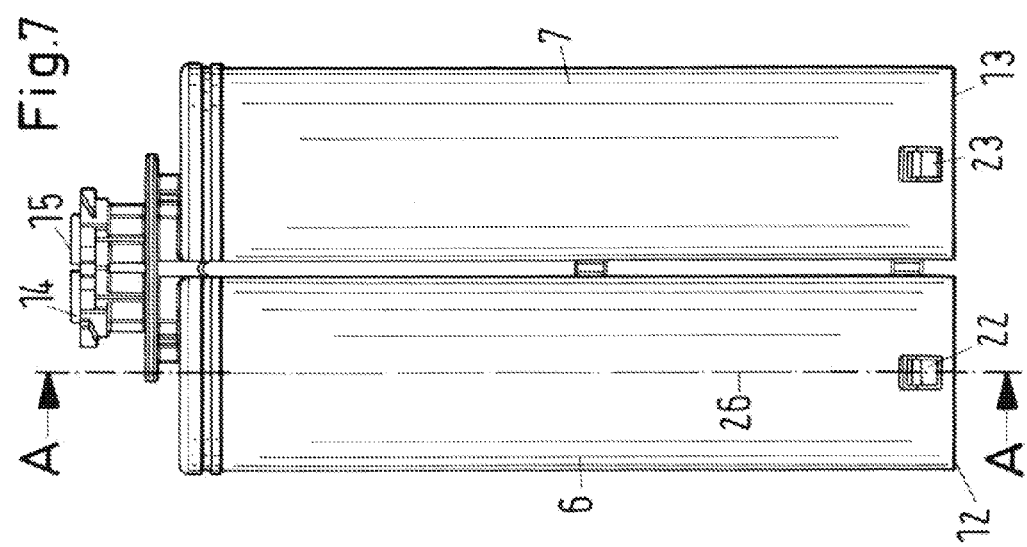

PISTON SECURING DEVICE

PRIORITY CLAIM

The present application claims priority to European Patent Application No. 11174214.4 filed on Jul. 15, 2011, the disclosures of which are incorporated herein by reference.

BACKGROUND

The invention relates to a piston securing device for a cartridge, in particular for a multicomponent cartridge, which is suitable for the simultaneous dispensing of a filler material. In the case of a multicomponent cartridge, the filler material is comprised of at least two components. The discharge of the two components takes place separately. The two components can only be mixed directly before use to be supplied to their intended use as a mixture.

Such a multicomponent cartridge is already known from WO9105731. This multicomponent cartridge includes a first hollow space and a second hollow space which can each be filled with a respective component. The first hollow space and the second hollow space have the shape of a cylinder and are arranged next to one another. Each of the two hollow spaces opens into a discharge nozzle through which a respective one of the components is discharged. A static mixer can be connected to the two discharge nozzles and the components being discharged separately through the discharge nozzles can be mixed with one another in it. Instead of the static mixer, a closure element can be connected to the discharge nozzles which serves for the closing of the two openings formed by the discharge nozzles. This closure element is required to store the two components separately in the first and second hollow spaces and to shield them from environmental influences such as light, atmosphere and the like.

A seal can be applied to the filling end of the first and second hollow spaces disposed opposite the discharge nozzles and likewise serves the purpose of storing the two components separately in the first and second hollow spaces. This seal is attached to the filling end subsequent to the filling of the first and second hollow spaces with the corresponding component. The filling of each of the two hollow spaces thus takes place at the filling end of the multicomponent cartridge. This seal is formed by a piston which is movable in the storage chamber.

It is disadvantageous in this structure that the piston inserted into the storage chamber after the filling is not fixed in the inner wall and it is thus possible that the piston is pressed at least partly out of the storage chamber, whereby it can lose its sealing function. The filler material can then be discharged in an uncontrolled manner, which makes the cartridge unusable and damage can arise due to corrosive or toxic filler materials. Such a movable piston also reacts actively to environmental influences such as an expansion of the fluid filler materials due to temperature fluctuations. The piston is urged in the direction of the filling end of the cartridge by the pressure forces hereby resulting and there is the risk of a displacement from the cartridge and of the uncontrollable discharge of filler material.

The securing of the piston previously took place by means of a cap which closes the cartridge base in a substantially form-fitted manner. However, this solution requires an additional component which allows the form-fitted connection of the cartridge and the cap. This means that an additional part has to be produced in the production process and has to be mounted onto the cartridge after the filling process. The additional part causes additional manufacturing costs. In addition, the filling of the cartridge is in many cases not carried out at the location at which the cartridge is manufactured. This has the consequence that the logistical effort is increased by this additional component, which makes this solution appear undesirable for economic reasons.

There is also the solution of providing a piston retention groove at the inner wall of the cartridge. This piston retention groove can, however, only be used for a specific dimension; otherwise the piston cannot be held in the piston retention groove. This dimension is in particular the inner diameter of the cartridge which amounts to at least 20 mm.

A further solution is the provision of a retention means, which is formed at the inner wall of the cylinder delimiting the storage chamber of a multicomponent cartridge, as shown in EP0688727 A1. The retention means consists of two retention elements which are arranged at an angle of 180° at the periphery of the inner wall. This retention means has to be assembled in a separate working step after the piston has received its final position in the cylinder, the cartridge being thus completely filled. Thus an additional working step and a special tool are required. By means of this special tool a portion of the cylinder wall is cut through and the cut through portion is flapped as a retention flap into the inner space. The piston rests on this retention flap and is supported thereby in a safe manner against loss. The cutting through and flapping of the retention flap is obtained according to EP 0688727 A1 by a pressing. For performing this operation it is necessary to stiffen the cylinder locally by a stiffening ring, such that it does not loose its shape during the pressing operation and filler mass may be discharged due to a leak appearing between the piston and the inner wall by the deformation of the cylinder wall. This process is complicated and due to the additional manufacturing step expensive.

Thus it is proposed according to EP0351441 A1 to foresee protrusions at the inner wall of the cylinder of the cartridge. However the piston has to be sufficiently flexible, so as to pass these pre-manufactured protrusions without damage, which entails additional requirements for the piston. It is also suggested that the cartridge body itself can be configured to be flexible which however can entail the above-mentioned problem of possible leakage of filler mass, if the piston passes the prefabricated protrusions and the cartridge body is deformed such that the piston looses contact to the wall.

A further solution has been proposed in DE202004017878 U1, according to which a lip is foreseen on the outer body of the piston, which engages in a groove at the cylinder wall. The lip engages in the groove such that the piston is fixed into its position. That means, that with this solution the piston can not be displaced into the direction of the discharge opening, when he is snapped in. Accordingly a complete filling of the cartridge after the setting of the piston is impossible. An air cushion remains between the filling mass which is pressed through the discharge opening into the inner space of the cylinder and the fixed piston. During the filling procedure, the air cushion is compressed and has to discharge either through a ventilation valve arranged on the piston or bypassing the filling mass through the discharge opening. Both solutions can have the consequence that air remains enclosed between the piston and the filling mass and the cylinder is filled incompletely.

SUMMARY

It is therefore the object of the invention to develop a cartridge which can be filled from the discharge end or from the filling end and which can be closed by a piston, with it being ensured that filler material can no longer exit the storage chamber through the filling end after the end of the filling. A further object of the invention is to foresee a retention means for the piston which can be arranged during the manufacture of the cartridge without any additional working step onto the cylinder wall and which does not constitute an obstacle for the piston during its assembly. A further object of the invention is to avoid that filling mass passes the piston and is discharged during the filling of the cartridge with filling mass. Furthermore it is to be avoided that air cushions remain between the piston and the filling mass during the filling with filling mass.

The cartridge in accordance with the invention contains a storage chamber for a fluid filler material in which a piston can be movably received. The storage chamber has a filling end and a discharge end as well as an inner wall extending between the filling end and the discharge end. The piston can be displaced along the inner wall in the storage chamber from the filling end to the discharge end to dispense the filler material from the storage chamber and the filler material can be sealingly enclosed in the storage chamber by the piston at the filling end. The piston can be captively held within the inner wall by a projection provided at the inner wall in the environment of the filling end. The projection is configured as a spring element. That means that the projection is itself elastically deformable and retractable. Thereby it is on one hand guaranteed that the piston can slide over the projection without being damaged, such that the inner wall of the cartridge is not unduly deformed if the piston passes the projections, such that no filler material can be discharged and on the other hand the set piston is slidable arbitrarily inside the cylinder for the filling in direction of the projections or for the discharge in direction of the discharge opening. The projection can in particular be formed as a hook-shaped element. By the shaping of the projection it can be manufactured in a single working step together with the cartridge In accordance with a further embodiment, the cartridge is designed as a multicomponent cartridge. This multicomponent cartridge includes a first storage chamber for a first component and a second storage chamber for a second component, with the first storage chamber being separate from the second storage chamber. In accordance with an embodiment, the first storage chamber can be arranged beside or within the second storage chamber. In accordance with a further embodiment, the first storage chamber can be arranged inside the second storage chamber. A first piston is movably received in the first storage chamber and a second piston is movably received in the second storage chamber. Each of the first or second storage chambers has a filling end and a discharge end. The first and second storage chambers can have a first and a second longitudinal dimension which extends between the corresponding filling end and the corresponding discharge end.

The first storage chamber has a first inner wall and the second storage chamber has a second inner wall. The corresponding discharge end can in particular open into a first discharge element in a first opening aperture and into a second discharge element in a second opening aperture. A projection for securing the piston is provided in the corresponding storage chamber in the environment of the filling end for at least one of the pistons.

The projection is in particular designed as an at least partly peripheral elevated portion along the jacket of the inner wall. The projection can include at least one first elevated portion and one second elevated portion.

The piston can have a piston body and a piston lip, with the piston being able to be held in contact with the inner wall of the corresponding storage chamber by means of the piston lip. The piston body is surrounded by a jacket surface at the peripheral side. The piston lip fills a ring space between the jacket surface of the piston body and inner wall of the storage chamber. The corresponding elevated portion has a maximum height which is larger than the spacing of the jacket surface of the piston body from the inner wall.

In accordance with each of the embodiments, the elevated portion can be designed as an arm which can in particular be rotated or folded into the storage chamber. This arm can have a finger element which is connected to the inner wall of the storage chamber. Such a finger element can in particular be advantageous for an injection molding process since the arm is also connected with the finger element in this case during the manufacture. If the cartridge is manufactured in one method step as a single injection molded part from the discharge end, the cavity for the arm can under certain circumstances no longer be completely filled with polymer melt due to the long flow path. The finger element provides an additional flow path for a complete filling of the cavity as a bypass.

The projection can be received in a recess of the inner wall so that the piston can be pushed over the projection. The projection can be designed as a spring element which has a shoulder element connected to the inner wall, a middle piece and a finger element and the middle piece and the finger element can be rotated or bent about the shoulder element. The finger element can in turn again be connected to the inner wall of the storage chamber, it can in particular be formed as a narrow bar.

The middle piece has an inclination toward the inner wall which amounts to a maximum of 70°, preferably a maximum of 45°.

The middle piece or the finger element can have a curvature with a radius of curvature of at least 0.3. "Or" should include the following cases in this respect: Only the middle piece has a curvature; only the finger element has a curvature; both the middle piece and the finger element have a curvature. The curvature of at least the middle piece of the finger element is in particular of advantage because the piston lip can slide off over this curvature without itself being damaged. Alternatively, however, also neither the finger element nor the middle piece can have a curvature.

The projection has a clearance which amounts to at least 70% of the width of the storage chamber. The clearance corresponds to the inner diameter at the point at which the projection extends the furthest into the inner space of the storage chamber.

The storage chamber has a peripheral dimension, with the projection having a width of a maximum of $\frac{1}{20}$, preferably $\frac{1}{30}$, particularly preferably $\frac{1}{40}$ of the peripheral dimension of the storage chamber.

The projection in particular has a height of a maximum of one percent, preferably 0.5%, particularly preferably 0.25%, of the width of the storage chamber.

The projection can include one first elevated portion and one second elevated portion. The first elevated portion and the second elevated portion are arranged at a distance from one another, with the distance between the first elevated portion and the corresponding second elevated portion amounting to a maximum of $\frac{1}{20}$, preferably $\frac{1}{50}$, particularly preferably $\frac{1}{100}$, of the peripheral dimension of the storage chamber.

The invention further relates to a method for manufacturing a cartridge by an injection molding method, including the step of manufacturing a projection at the inner wall of the cartridge, with the injection molding tool having a cavity for the storage chamber as well as for the wall of the storage chamber and the injection molding tool having a core which fills the inner space of the storage chamber and the core for forming the storage chamber is removed from the cavity in that it is pulled from the cavity past the projection.

The projection is in particular designed as a spring element which is urged in the direction of the inner wall by the core so that the core can be pulled past the projection. A recess is advantageously provided in the inner wall in which the projection is at least partly received when the core passes the projection. The core thus presses the projection into the recess. So that the core cannot catch at the projection, the projection advantageously has a finger element with a curvature. The curvature advantageously has a radius of curvature which can be in the range of at least 0.3 mm.

Alternatively, the projection can be manufactured in the injection molding process together with the wall of the cartridge. The projection includes an arm. This arm can have a finger element which is connected to the inner wall of the storage chamber. The projection can form one or more elevated portions. A passage which extends from the cartridge wall to the arm is formed for the polymer melt in the injection molding process by the passageway in the injection molding tool corresponding to the finger element. The passage allows the injection molding of the arm substantially simultaneously with the injection molding of the inner wall, in particular of the inlet end.

When the storage chamber is filled with a filler material and a piston is inserted at the filling end and is guided past the projection, the projection is pressed in the direction of the inner wall and is returned into the original position after the passage of the piston so that the piston is secured against exiting the storage chamber.

Additionally or alternatively to this, the contour and the cavity can be coordinated with one another for the improved interplay between the core of the injection molding tool and the contour of the cavity, that is of the hollow space, which corresponds to the shape of the storage chamber of the cartridge, so that the contour of the projection allows a scraping off and a constant elastic deflection while the core is removed from the storage chamber, that is during the demolding process. The demolding process takes place as follows: first, the two tool halves which surround the cavity are moved apart so that the cartridge is exposed. Subsequently, the cartridge can be scraped off the core. In this process, the projection is, or the projections are, urged outwardly so that the projection is not damaged. After the demolding, the projection again moves back into its original position. The cooling of the inner wall, which takes place later, likewise has a positive effect on the deforming of the projections; they are rotated further into the inner space of the storage chamber by thermal strains during the cooling.

When a piston is inserted into the storage chamber, the projections are outwardly displaced, that is in the direction of the inner wall. The projections again adopt their original position after passing the piston. If the piston should move in the direction of the projections by an increased inner pressure in the storage chamber, it slides into the projections and is held tight in the cartridge by the projections.

Additional features and advantages are described herein, and will be apparent from the following Detailed Description and the figures.

BRIEF DESCRIPTION OF THE FIGURES

The invention will be explained in the following with reference to the drawings. There are shown:

FIG. 7: a frontal view of a multicomponent cartridge in accordance with FIG. 2; and.

FIG. 8: a section of the left-sided cartridge half of FIG. 7.

DETAILED DESCRIPTION

Figure 1:
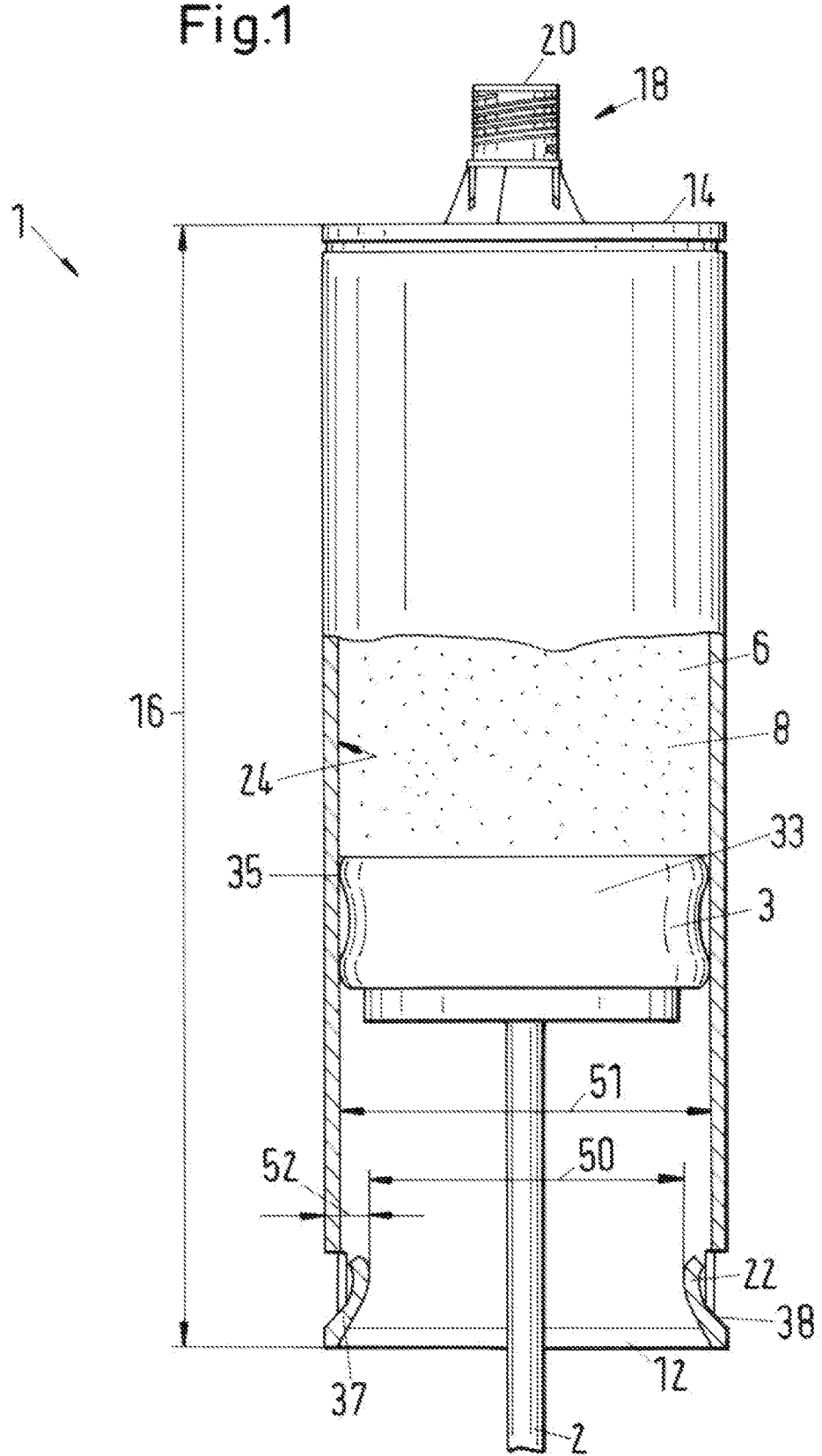
FIG. 1: a section through a cartridge in accordance with a first embodiment of the invention.

FIG. 1 shows a first embodiment of a cartridge 1 in accordance with the invention. Such a cartridge is in particular used for metering a filler material which includes at least one component. The cartridge 1 includes a storage chamber 6 for the component 8. The cartridge is partly stored in a filled condition which will be called the storage condition in the following. It must be ensured for the total duration of the storage condition that the component 8 does not exit the storage chamber.

The multi-component cartridge has an inlet end and an outlet end. The inlet end includes inlet openings by means of which the chambers 6, 7 can be filled with the corresponding components. The outlet end includes discharge ends 14, 15 which are shown in FIG. 3. In order to press the components out of the chambers 6, 7 the multi-component cartridge has a dispensing plunger 2 which can be pressed from below the inlet end of the multi-component cartridge in FIG. 2. The dispensing plunger has a corresponding piston element for each of the chambers 6, 7 which are displaceable along the inner wall of the chambers. The components present in the chambers are pushed in the direction of the discharge ends 14, 15 on a movement of these pistons in the direction of the outlet end. The discharge ends 14, 15 include discharge openings 10, 11 which in turn are visible in FIG. 3.

The cartridge has a filling end 12 via which a piston 3 can be introduced into the storage chamber 6. The piston 3 is movably received in the storage chamber 6. The piston 3 slides along an inner wall 24 of the storage chamber 6 in the direction of the discharge end 14 when the filler material in the storage chamber 6, that is the component 8, should be expelled.

The piston 3 is movable, for example, by means of a plunger 2. The plunger is in particular designed so that it lies on the piston 3. The piston 3 is moved from the filling end 12 in the direction of the discharge end 14 with the aid of the plunger when the component should be dispensed.

The storage chamber 6 has a length dimension 16 which extends between the filling end 12 and the discharge end 14. The storage chamber 6 has an inner wall 24 which surrounds the storage chamber 6 as a jacket.

The discharge end 14 of the storage chamber 6 opens into a discharge element 18 which contains an opening aperture 20. The component 8 is thus expelled from the storage chamber 6 into the discharge element 18 and is conducted through the opening aperture 20. A strand of the component 8, which can be supplied to a use in this form, is formed subsequent to the opening aperture 20.

The cartridge can be filled via the filling end 12 or also via the discharge element 18. The piston 3 is located in the latter case at a position before the filling which has the smallest possible spacing from the discharge end 14. In this position of the piston, a small quantity of air can be located between the piston 3 and the discharge end 14 which can exit the storage chamber via a venting element, not shown.

The piston 3 has a piston body 33 and a piston lip 35, with the piston 3 being able to be held in contact with the inner wall 24 of the storage chamber 6 by means of the piston lip. The piston lip 35 thus forms a seal for the filler material by means of which it is prevented that the filler material is discharged from the storage chamber. The piston lip 35 fills a ring space between the piston body 33 and the inner wall of the storage chamber 6.

The piston 3 can be captively held within the inner wall by a projection 22 provided at the inner wall in the environment of the filling end.

The storage chamber 6 has a peripheral dimension, with the projection 22 having a width of a maximum of 1/20, preferably 1/30, particularly preferably 1/40, of the peripheral dimension of the storage chamber 6.

The projection 22 in particular has a height of a maximum of one percent, preferably 0.5%, particularly preferably 0.25%, of the diameter of the storage chamber 6.

The projection 22 can include a first elevated portion 37 and a second elevated portion 38. The first elevated portion 37 and the second elevated portion 38 are arranged at a distance 46 from one another, with the distance 46 between the first elevated portion 37 and the corresponding second elevated portion 38 amounting to a maximum of 1/20, preferably 1/50, particularly preferably 1/100, of the peripheral dimension 31 of the storage chamber 6.

Figure 2:
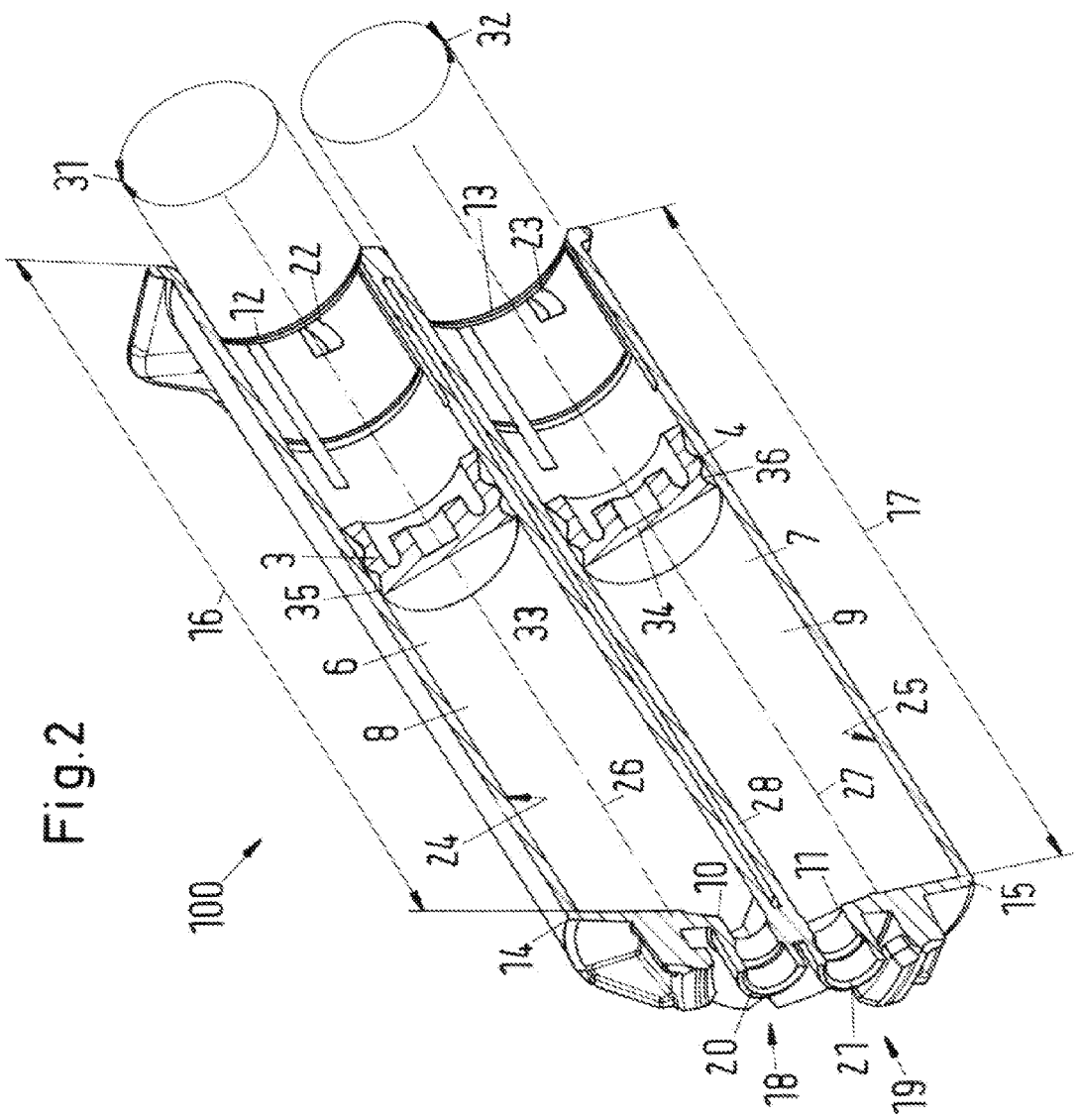
FIG. 2: a section through a multicomponent cartridge in accordance with a second embodiment of the invention.
Figure 3:
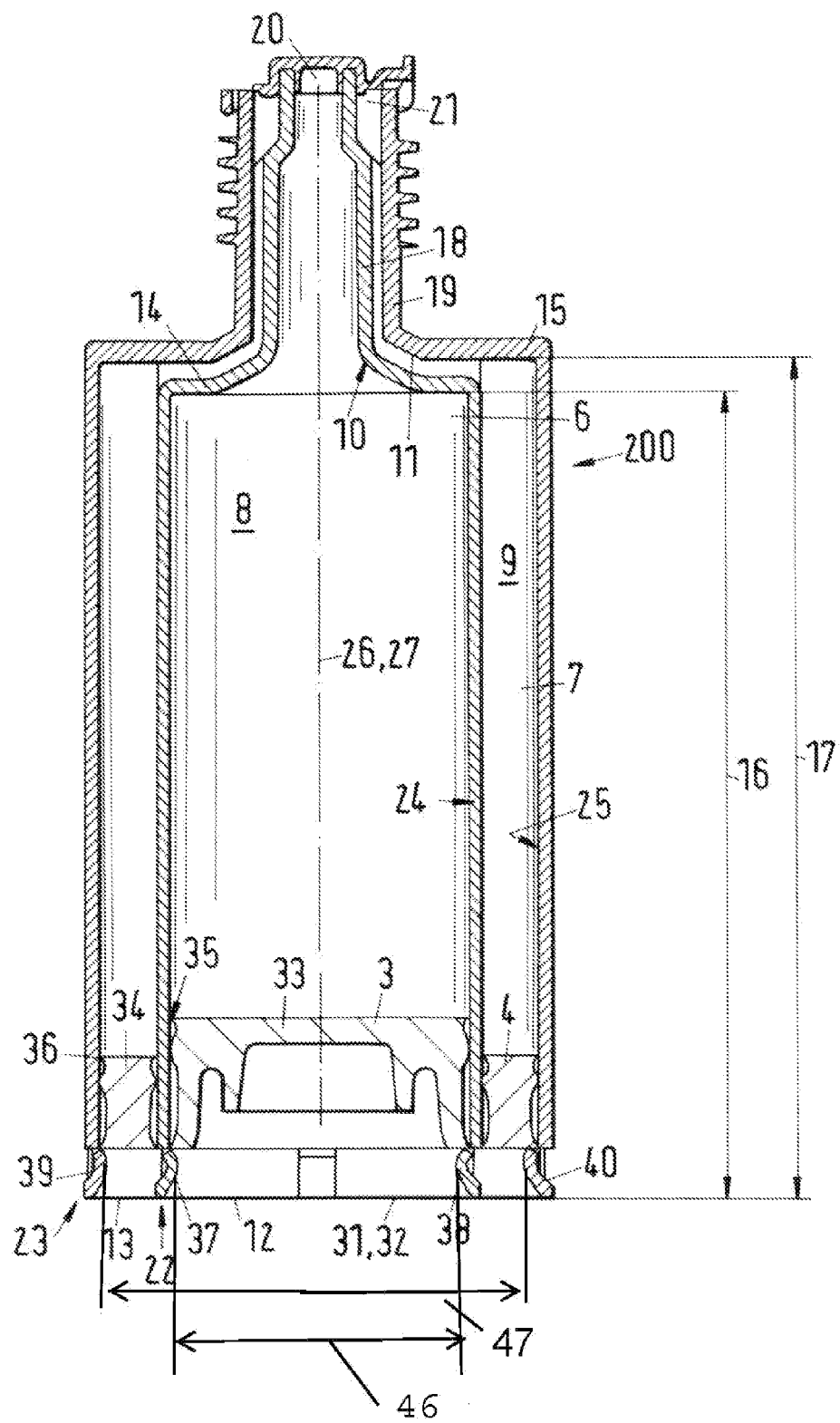
FIG. 3: a section through a multicomponent cartridge in accordance with a third embodiment of the invention.

FIG. 2 shows a second embodiment of the multicomponent cartridge 100 in accordance with the invention. Such a multicomponent cartridge is in particular used for the metering of a filler material which includes at least two components which may not come into contact with one another before their common use. The multicomponent cartridge 100 includes a first storage chamber 6 for a first component 8 and a second storage chamber 7 for a second component 9. The first storage chamber 6 is separate from the second storage chamber 7 so that the two components do not come into contact with one another. Such components usually interact with one another as soon as they come into contact with one another, with chemical reactions being able to take place. This interaction of the components is usually the effect which is required in an application; however, this interaction is unwanted as long as the components are being stored. Each of the components can naturally in turn include a mixture of a plurality of substances. The multicomponent cartridge is partly stored in a filled condition which will be called the storage condition in the following. It must be ensured for the total period of the storage condition that the two components 8, 9 do not come into contact with one another.

The multicomponent cartridge has a first filling end 12 and a second filling end 13 via which a first piston 3 and a second piston 4 can be introduced into the corresponding first and second storage chambers 6, 7. The first piston 3 is movably received in the first storage chamber 6. The second piston 4 is movably received in the second storage chamber 7. This first piston 3 slides along a first inner wall 24 of the storage space 6 in the direction of the first discharge end 14 when the filler material located in the first storage chamber 6, that is the first component 8, should be expelled. The second piston 4 slides along a second inner wall 25 of the second storage chamber 7 in the direction of the second discharge end 15 when the filler material in the second storage chamber 7, that is the second component 9, should be expelled.

The first and second pistons 3, 4 are movable by means of a plunger, not shown, for example. The plunger is in particular designed so that it lies on the first and second pistons 3, 4. With the aid of the plunger, the first piston 3 is moved from the first filling end 12 in the direction of the first discharge end 14 and the second piston 4 is moved from the second filling end 13 to the second discharge end 15 when the components 8, 9 are dispensed simultaneously.

The first and second storage chambers 6, 7 are connected to one another at least at the discharge end 14, 15 such that the position of the first storage chamber 6 relative to the second storage chamber is defined. The first storage chamber 6 has a first longitudinal dimension 16 which extends between the first filling end 12 and the first discharge end 14; the second storage chamber 7 has a second longitudinal dimension 17 which extends between the second filling end 13 and the second discharge end 15. The first storage chamber 6 has a first inner wall 24 and the second storage chamber 7 has a second inner wall 25. The first or second inner wall 24, 25 surrounds the corresponding storage chamber 6, 7.

The respective discharge end 14, 15 of the corresponding storage chamber 6, 7 opens into a discharge element 18, 19 which contains a corresponding first opening aperture 20 and a second opening aperture 21. The first component 8 is thus expelled from the first storage chamber 6 into the first discharge element 18 and is conducted through the first opening aperture 20. The same applies accordingly to the second component 9 which is expelled into the second discharge element 19 and is conducted through the second opening aperture 21. Adjoining the first and second opening apertures 20, 21, two strands of the first and second components 8, 9 are formed which are either supplied to an application in this form or, alternatively to this, are conducted into a mixer which is connected to the first and second discharge elements 18, 19 and in which the two strands are mixed with one another.

The multicomponent cartridge can be filled via the first or second filling end 12, 13 or via the first discharge element 18 or the second discharge element 19. The piston 3, 4 is located in the latter case at a position before the filling which has the smallest possible spacing from the first or second discharge end 14, 15. In this position of the pistons, only a small quantity of air is located between the corresponding piston 3, 4 and the discharge end 14, 15 which is here formed as a wall with a corresponding first and second opening aperture 20, 21 only shown in FIG. 2.

When the first component 8 and the second component 9 move into the corresponding storage chamber 6, 7, the air located between corresponding pistons 3, 4 and the filler material is compressed and can escape through a venting element arranged on or between the piston 3, 4 and the inner wall 24, 25.

At least one each of the first and second pistons 3, 4 in each case has a piston body 33, 34 and a piston lip 35, 36, with the piston 3, 4 being able to be held in contact with the corresponding inner wall 24, 25 of the corresponding storage chamber 6, 7 by means of the piston lip. The piston lip 35, 36 thus forms a seal for the filler material by means of which it is prevented that the filler material is discharged from the storage chamber. The piston lip 35, 36 fills a ring space between the piston body 33, 34 and the inner wall of the storage chamber 6, 7.

It is shown in FIG. 2 that the first storage chamber 6 is arranged next to the second storage chamber 7. The first storage chamber 6 is separated from the second storage chamber 7 by a dividing wall 28 so that the two components 8, 9 can be stored separately. The first storage chamber 6 has a first longitudinal axis 26 and the second storage chamber 7 has a second longitudinal axis 27 so that the first storage chamber 6 extends along the longitudinal axis 26 and the second storage chamber 7 extends along the longitudinal axis 27. The first storage chamber 6 and the second storage chamber 7 open at the first discharge end 14 into a first discharge opening 10 and at the second discharge end 15 into a second discharge opening 11.

The first and the second components 8, 9 can be conducted to the first and second opening apertures 20. 21, and optionally to a mixer connected to the opening aperture, and not shown here, by the first discharge opening 10 and the second discharge opening 11. A plurality of first discharge openings or a plurality of second discharge openings can also be provided between which bars are formed.

Each of the storage chambers 6, 7 has a respective peripheral dimension 31, 32, with the projections 22, 23 having a width of a maximum of 1/20, preferably 1/30, particularly preferably 1/40, of the peripheral dimension 31, 32 of the corresponding storage chamber 6, 7.

The projection 22, 23 in particular has a height of a maximum of one percent, preferably 0.5%, particularly preferably 0.25%, of the diameter of the storage chamber 6, 7.

The first elevated portion 37, 39 and the second elevated portion 38, 40 are arranged at a spacing 46, 47 from one another, with the spacing 46, 47 between the first elevated portion 37, 39 and the second elevated portion 38, 40 amounting to a maximum of 1/20, preferably 1/50, particularly preferably 1/100, of the peripheral dimension 31, 32 of the corresponding storage chamber 6, 7.

FIG. 3 shows a third embodiment of a multicomponent cartridge 200 which is formed as a coaxial cartridge in the present case. Such a multicomponent cartridge is in particular used for the metering of a filler material which includes at least two components which may not come into contact with one another before their common use. The multicomponent cartridge 200 includes a first storage chamber 6 for a first component 8 and a second storage chamber 7 for a second component 9. The first storage chamber 6 is separate from the second storage chamber 7 so that the two components do not come into contact with one another. Such components usually interact with one another as soon as they come into contact with one another, with chemical reactions being able to take place. This interaction of the components is usually the effect which is required in an application; however, this interaction is unwanted as long as the components are being stored. Each of the components can naturally in turn include a mixture of a plurality of substances. The multicomponent cartridge is partly stored in a filled condition which will be called the storage condition in the following. It must be ensured for the total period of the storage condition that the two components 8, 9 do not come into contact with one another.

The multicomponent cartridge has a first filling end 12 and a second filling end 13 via which a first piston 3 and a second piston 4 can be introduced into the corresponding first and second storage chambers 6, 7. The first piston 3 is movably received in the first storage chamber 6. The second piston 4 is movably received in the second storage chamber 7. This first piston 3 slides along a first inner wall 24 of the storage space 6 in the direction of the first discharge end 14 when the filler material located in the first storage chamber 6, that is the first component 8, should be expelled. The second piston 4 slides along a second inner wall 25 of the second storage chamber 7 in the direction of the second discharge end 15 when the filler material in the second storage chamber 7, that is the second component 9, should be expelled. The second piston 4 is formed as a ring piston. The inner side of the piston 4 slides along the outer wall of the pipe element surrounding the first storage chamber 6.

The first and second pistons 3, 4 are movable by means of a plunger, not shown, for example. The plunger is in particular designed so that it lies on the first and second pistons 3, 4. With the aid of the plunger, the first piston 3 is moved from the first filling end 12 in the direction of the first discharge end 14 and the second piston 4 is moved from the second filling end 13 to the second discharge end 15 when the components 8, 9 are dispensed simultaneously.

The first and second storage chambers 6, 7 are connected to one another at least at the discharge end 14, 15 such that the position of the first storage chamber 6 relative to the second storage chamber 7 is defined. The first storage chamber 6 has a first longitudinal dimension 16 which extends between the first filling end 12 and the first discharge end 14, the second storage chamber 7 has a second longitudinal dimension 17 which extends between the second filling end 13 and the second discharge end 15. The first storage chamber 6 has a first inner wall 24 and the second storage chamber 7 has a second inner wall 25. The first or second wall 24, 25 surrounds the corresponding storage chamber 6, 7.

The respective discharge end 14, 15 of the storage chamber 6, 7 opens into a discharge element 18, 19 which contains a corresponding first opening aperture 20 and a second opening aperture 21. The first component 8 is thus expelled from the first storage chamber 6 into the first discharge element 18 and is conducted through the first opening aperture 20. The same applies accordingly to the second component 9 which is expelled into the second discharge element 19 and is conducted through the second opening aperture 21. Adjoining the first and second opening apertures 20, 21, two strands of the first and second components 8, 9 are formed which are either supplied to an application in this form or, alternatively to this, are conducted into a mixer which is connected to the first and second discharge elements 18, 19 and in which the two strands are mixed with one another.

The multicomponent cartridge can be filled via the first or second filling end 12, 13 or via the first discharge element 18 or the second discharge element 19. The piston 3, 4 is located in the latter case at a position before the filling which has the smallest possible spacing from the first or second discharge end 14, 15. In this position of the pistons, only a small quantity of air is located between the corresponding piston 3, 4 and the discharge end 14, 15 which is here formed as a wall with a corresponding first and second opening aperture 20, 21 only shown in FIG. 2.

When the first component 8 and the second component 9 move into the corresponding storage chamber 6, 7, the air located between the corresponding piston 3, 4 and the filler material is compressed and can escape through a venting element arranged between the piston 3, 4 and the inner wall 24, 25.

At least one each of the first and second pistons 3, 4 in each case has a piston body 33, 34 and a piston lip 35, 36, with the piston 3, 4 being able to be held in contact with the corresponding inner wall 24, 25 of the corresponding storage chamber 6, 7 by means of the piston lip. The piston lip 35, 36 thus forms a seal for the filler material by means of which it is prevented that the filler material is discharged from the storage chamber. The piston lip 35, 36 fills a ring space between the piston body 33, 34 and the inner wall of the storage chamber 6, 7.

It is shown in FIG. 3 that the first storage chamber 6 is arranged within the second storage chamber 7. The first storage chamber 6 is separated from the second storage chamber 7 by a pipe element which forms the inner wall 24 so that the two components 8, 9 can be stored separately. The first storage chamber 6 has a first longitudinal axis 26 and the second storage chamber 7 has a second longitudinal axis 27 so that the first storage chamber 6 extends along the longitudinal axis 26 and the second storage chamber 7 extends along the longitudinal axis 27. In the present embodiment, the first and second longitudinal axes 26, 27 coincide. The first storage chamber 6 and the second storage chamber 7 open at the first discharge end 14 into a first discharge opening 10 and at the second discharge end 15 into a second discharge opening 11.

The first and the second components 8, 9 can be conducted to the first and second opening apertures 20. 21, and optionally to a mixer connected to the opening apertures, and not shown here, by the first discharge opening 10 and the second discharge opening 11.

Each of the storage chambers 6, 7 has a respective peripheral dimension 31, 32, with the projections 22, 23 having a width of a maximum of ⅟20, preferably ⅟30, particularly preferably ⅟40, of the peripheral dimension 31, 32 of the corresponding storage chamber 6, 7. The peripheral dimension 31 is in this case a circle of the length $D1*\pi$, where D1 is the diameter of the storage chamber 6. The peripheral dimension 32 is in this case a circle of the length $D2*\pi$, where D2 is the diameter of the storage chamber 7.

The projection 22 in particular has a height of a maximum of one percent, preferably 0.5%, particularly preferably 0.25%, of the diameter D1 of the storage chamber 6. The projection 23 in particular has a height of a maximum of one percent, preferably 0.5%, particularly preferably 0.25%, of the diameter D2 of the storage chamber 7.

The first elevated portion 37, 39 and the second elevated portion 38, 40 are arranged at a spacing 46, 47 from one another, with the spacing 46, 47 between the first elevated portion 37, 39 and the corresponding second elevated portion 38, 40 amounting to a maximum of ⅟20, preferably ⅟50, particularly preferably ⅟100, of the peripheral dimension 31, 32 of the corresponding storage chamber 6, 7.

Figure 4:
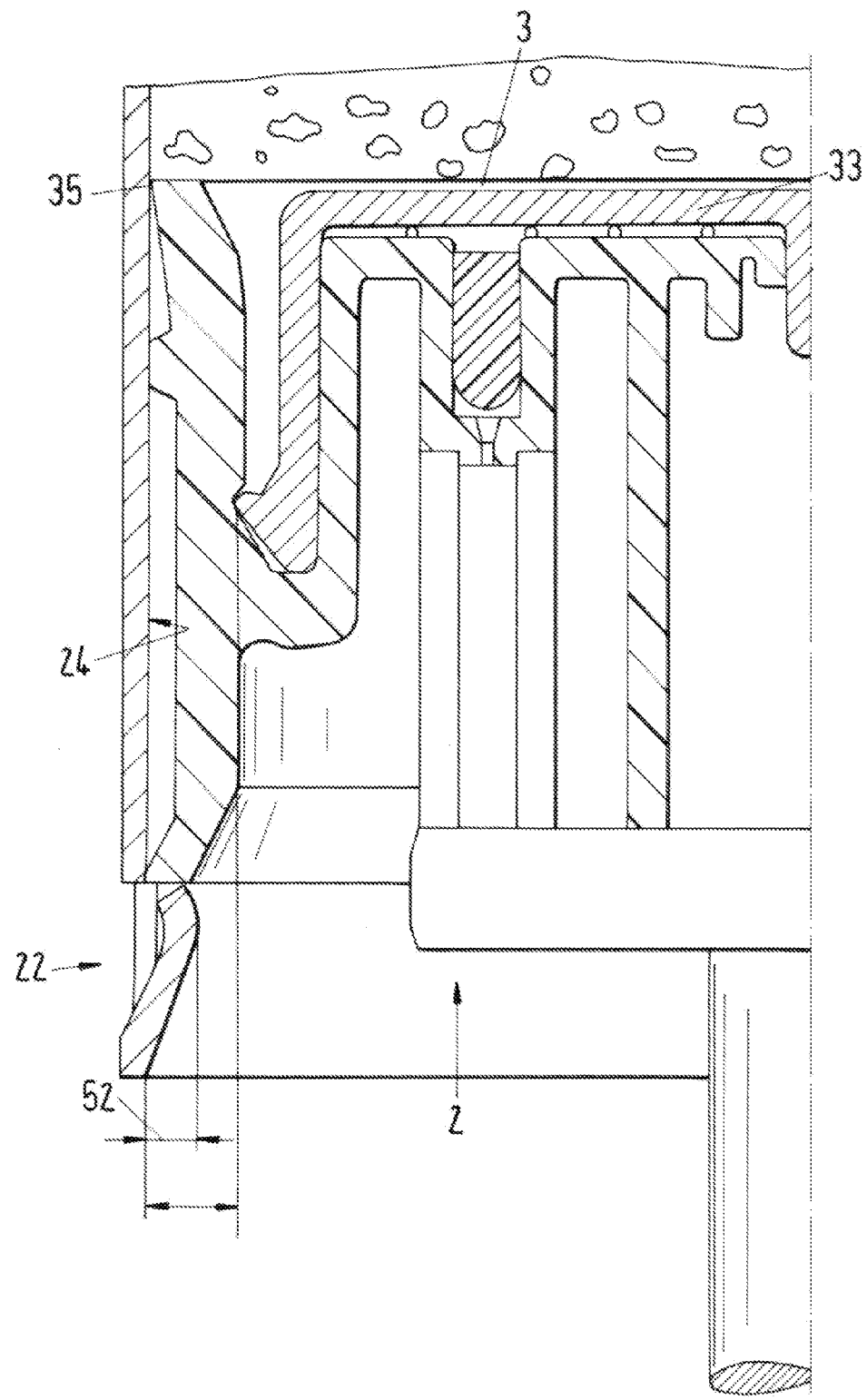
FIG. 4: a section through the filling end of a cartridge in accordance with one of the preceding embodiments.

FIG. 4 shows a section through the filling end of a cartridge in accordance with one of the preceding embodiments. Half of a storage chamber 6 and half of a piston 3 arranged in the storage chamber 6 are shown. The section is thus bounded at the left side by the inner wall 24 and at the right side by the longitudinal axis 26. This embodiment can be used, for example, for a cartridge in accordance with FIG. 1, FIG. 2, or for the storage chamber 6 of the embodiment in accordance with FIG. 3. A plunger 2 is also shown which lies on ribs belonging to the piston body 33. The piston body 33 can also be formed in multiple parts. A cover element can in particular be provided to screen the piston body from damaging influences of the filler material.

Figure 5:
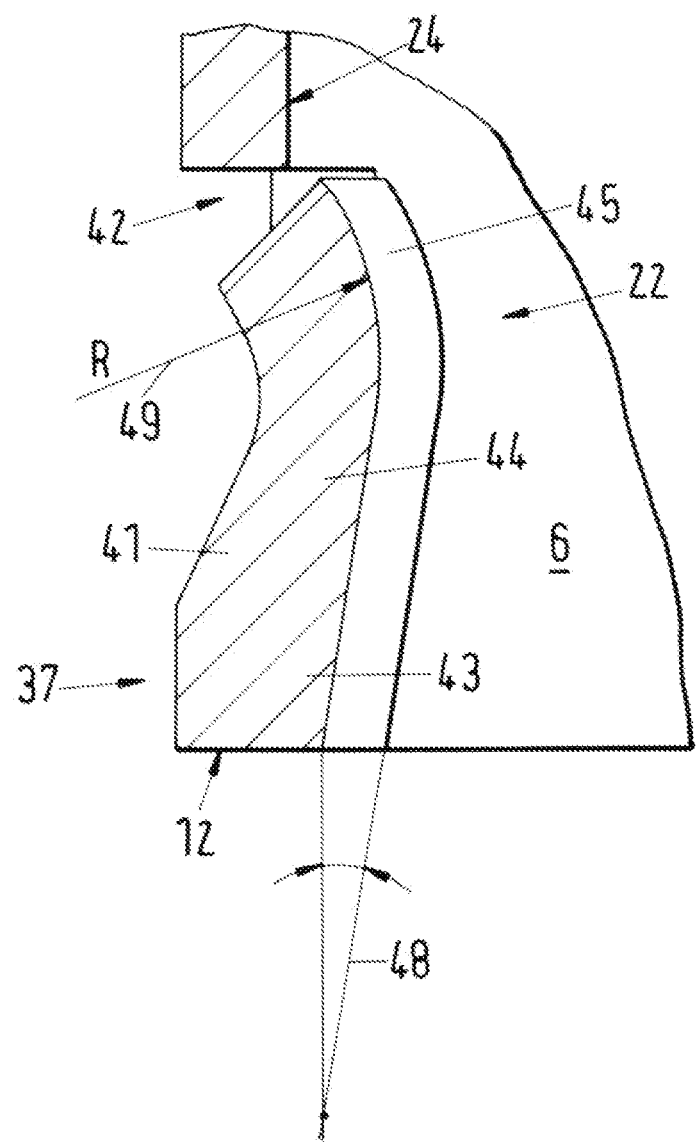
FIG. 5: a detail of the projection in accordance with FIG. 4.

FIG. 5 shows a detail of the projection 22, 23 in accordance with FIG. 4. The projection 22 is formed by way of example as an arm, as an elevated portion 37 projecting into the inner space of the storage chamber 6. This embodiment can naturally be used for each of the projections 22, 23 or each of the elevated portions 37, 38, 39, 40.

The arm can be folded into the storage chamber, that is the arm 41 projects at least partly into the inner space of the storage chamber 6. The projection 22 can be received in a recess 42 of the inner wall 24 so that the piston 3 can be pushed over the projection 22.

The projection, in particular the arm 41, is thus formed as a spring element. The projection includes a shoulder element 43 connected to the inner wall; the arm 41 has a middle piece 44 and a finger element 45; and the middle piece 44 and the finger element 45 are rotatable about the shoulder element 43. The shoulder element 43 represents the connection between the wall of the cartridge or of the storage chamber.

The middle piece 44 has an inclination toward the inner wall 24 which amounts to a maximum of 70°, preferably a maximum of 45°. The inclination angle is marked by 48 in FIG. 5. The finger element 45 has a curvature with a radius of curvature R, reference numeral 49, of a minimum of 0.3 mm.

The projection has a clearance 50 which amounts to at least 70% of the width 51 of the storage chamber. The clearance 50 is shown in FIG. 1. The width of the storage chamber corresponds to the diameter D1 or D2 of the storage chamber. The height of the projection 52 corresponds in FIG. 1 to half the difference between the diameter D1, or the width 51 minus the clearance 50, since a first elevated portion 37 and a second elevated portion 38 are arranged opposite one another in FIG. 1.

Figure 6:
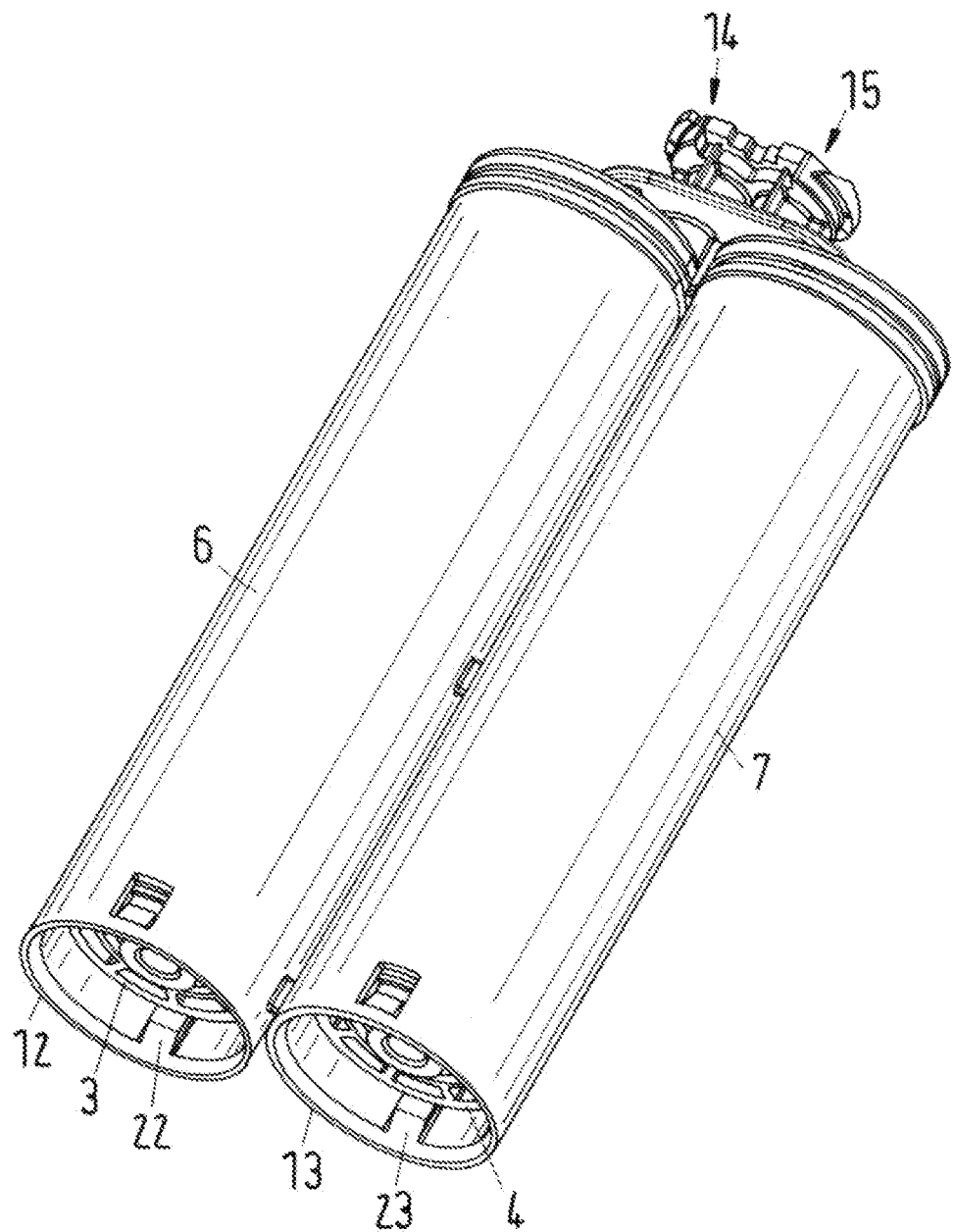
FIG. 6: a view of a multicomponent cartridge in accordance with FIG. 2.

FIG. 6 shows a view of a multicomponent cartridge in accordance with FIG. 2. FIG. 6 shows a multicomponent cartridge having two storages chambers 6, 7 disposed next to one another, as shown in FIG. 2. The cartridge has a first filling end and a second filling end 12, 13 and a first and second discharge end 14, 15. This multicomponent cartridge is shown in the condition in which the two storage chambers 6, 7 are completely filled with the corresponding components. Openings are located at the first and second discharge ends which can be closed by a plug, not shown, when the components are to be stored in the cartridge. FIG. 6 also shows a part of each of the pistons 3, 4 which are captively held by the projections 22, 23. The arrangement of the projections is also drawn in FIG. 7 which represents a frontal view of a multicomponent cartridge in accordance with FIG. 2. In FIG. 7, the sectional plane A-A is also shown which is disposed normal to the surface of the drawing and contains the longitudinal axis 26. FIG. 8 shows the section A-A of the cartridge half at the left of FIG. 7. The projection 22 is also visible in section. The projection 22 is composed of a first elevated portion 37 and of a second elevated portion 38. The elevated portion 37 is arranged opposite the elevated portion 38. The elevated portion 37 is in particular arranged with mirror symmetry with respect to a normal plane which contains the longitudinal axis 26 and which is arranged normal to the plane of the drawing.

The filler material is held in a fluid-tight manner in the storage chamber 6 when the first discharge end 14 is closed. The piston 3 has a piston lip 35 for this purpose. The arrangement of the piston 4 in the storage chamber 7 corresponds to the arrangement of the piston 3 in the storage chamber 6.

If only one elevated portion 37 is provided or if a plurality of elevated portions are provided which are not opposite one another, the height 52 of each projection corresponds to the difference of the width 51 and the clearance 50. These geometrical relationships also apply to all embodiments.

It is naturally possible that the cross-section of the storage chambers is also made oval or polygonal instead of circular. In this case, the width does not correspond to the diameter, but rather to the width dimension of the storage chamber at the point at which the projection is provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A cartridge containing a storage chamber for a fluid filler material in which a piston is movably receivable, wherein the storage chamber has a filling end and a discharge end and an inner wall extending between the filling end and the discharge end and the piston is displaceable in the storage chamber from the filling end to the discharge end along the inner wall to dispense the filler material from the storage chamber and the filler material can be sealingly enclosed in the storage chamber by the piston at the filling end, characterized in that the piston is captively held within the inner wall by a projection provided at the inner wall in the environment of the filling end wherein the projection is configured as a spring element, and wherein the spring element comprises:
  a shoulder element connected to the inner wall;
  a middle piece;
  and a finger element;
  and the middle piece and the finger element are rotatable or bendable about the shoulder element; and wherein the finger element has a curvature with a radius of curvature of at least 0.3 mm.

2. A cartridge in accordance with claim 1, wherein the cartridge is designed as a multicomponent cartridge including a first storage chamber for a first component, a second storage chamber for a second component, wherein the first storage chamber is separate from the second storage chamber, wherein the first storage chamber is arranged beside or within the second storage chamber, wherein a first piston is movably received in the first storage chamber and a second piston is movably received in the second storage chamber, wherein each of the first or second storage chambers each have a filling end and each have a discharge end, wherein the first storage chamber has a first inner wall and the second storage chamber has a second inner wall, wherein a projection for securing the piston in the corresponding storage chamber is provided for at least one of the pistons in the environment of the filling end.

3. A cartridge in accordance with claim 1, wherein the projection is designed as an at least partly peripheral elevated portion along the jacket of the inner wall.

4. A cartridge in accordance with claim 1, wherein the projection includes at least one first elevated portion and one second elevated portion.

5. A multicomponent cartridge in accordance with claim 1, wherein the piston has a piston body and a piston lip, wherein the piston can be held in contact with the inner wall of the corresponding storage chamber by means of the piston lip of the pistons, wherein the piston lip fills a ring space between the piston body and the inner wall of the storage chamber, wherein a corresponding elevated portion has a maximum height which is larger than the spacing of a jacket surface from the inner wall.

6. A cartridge in accordance with claim 1, wherein the elevated portion is designed as an arm.

7. A cartridge in accordance with claim 6, wherein the arm can be folded into the storage chamber.

8. A cartridge in accordance with claim 1, wherein the projection can be received in a recess of the inner wall so that the piston can be pushed over the projection.

9. A cartridge in accordance with claim 1, wherein the middle piece has an inclination toward the inner wall which amounts to a maximum of 70°, preferably a maximum of 45°.

10. A cartridge in accordance with claim 1, wherein the projection has a clearance which amounts to at least 70% of the width of the storage chamber.

11. A method for manufacturing the cartridge according to claim 1, wherein the storage chamber is filled with a filler mass and a piston is inserted at the filling end and is guided past the projection, wherein the projection is urged in the direction of the inner wall and is returned into the original position after the passage of the piston so that the piston is secured against exiting the storage chamber.

* * * * *